United States Patent [19]

Bar-On et al.

[11] Patent Number: 5,794,154
[45] Date of Patent: Aug. 11, 1998

[54] COMMUNICATIONS SYSTEM AND METHOD OF OPERATION

[75] Inventors: David Bar-On, Sireni 10; Leonard Wurtzel, Kochav Yair, both of Israel

[73] Assignee: Motorola, Inc., Schaumburg, Ill.

[21] Appl. No.: 692,900

[22] Filed: Jul. 26, 1996

[30] Foreign Application Priority Data

Jul. 26, 1995 [GB] United Kingdom ............. 9515341

[51] Int. Cl.$^6$ ................................................. H04R 1/00
[52] U.S. Cl. ........................... 455/509; 455/450; 455/516
[58] Field of Search ........................... 455/422, 426, 455/450, 509, 514, 516, 518, 519, 520

[56] References Cited

U.S. PATENT DOCUMENTS

| | | | |
|---|---|---|---|
| 4,553,263 | 11/1985 | Smith et al. | 455/518 |
| 4,833,701 | 5/1989 | Comroe et al. | 455/509 |
| 5,101,502 | 3/1992 | Felderman et al. | 455/520 |
| 5,287,551 | 2/1994 | Gustafson, Jr. et al. | 455/509 |
| 5,363,427 | 11/1994 | Ekstrom et al. | 455/450 |
| 5,423,061 | 6/1995 | Fumarolo et al. | 455/519 |
| 5,513,381 | 4/1996 | Sasuta | 455/509 |
| 5,524,273 | 6/1996 | Coley et al. | 455/509 |
| 5,551,063 | 8/1996 | Brandon et al. | 455/509 |

*Primary Examiner*—Nguyen Vo
*Assistant Examiner*—Marsha D. Banks-Harold
*Attorney, Agent, or Firm*—M. Mansour Ghomeshi

[57] ABSTRACT

A method of operation of a radio communications system having a controller controlling communications of a plurality of communicating units on a plurality of communication channels. The method includes the steps of a first communications unit transmitting a call request (100) to the controller and the controller reserving a first communications channel for a communications unit required in the requested call. The controller allocates the first communications channel for temporary communications to other communicating units whilst waiting for the availability of a second communications channel for the requested call, wherein the second communications channel is to be allocated to a second communications unit required in the requested call. A communications system having a channel allocation controller (12) having a list of communications channels (16) with reserved indicators (18) indicative of the status of reserved communications channels.

8 Claims, 3 Drawing Sheets

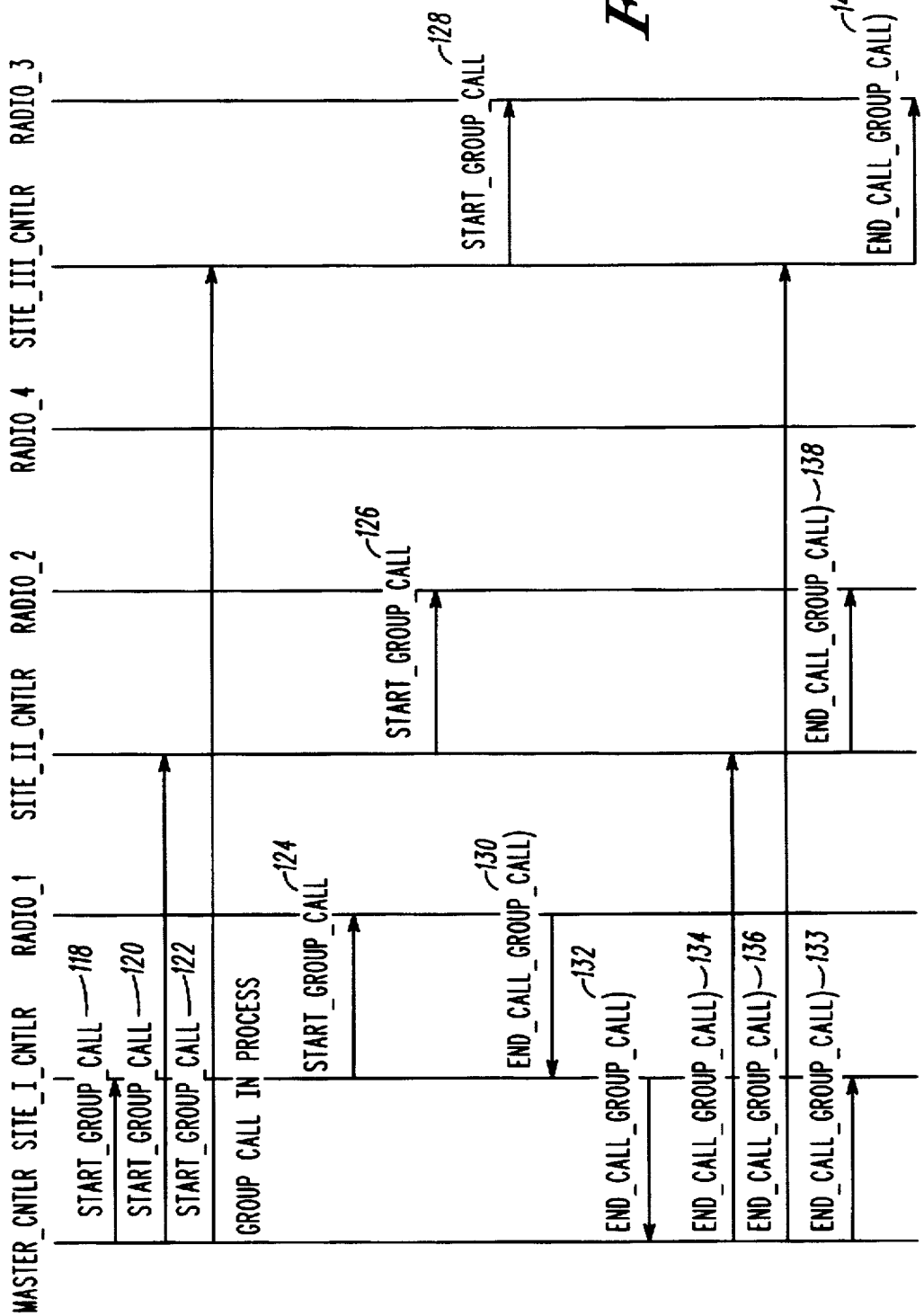

5,794,154

1

COMMUNICATIONS SYSTEM AND METHOD OF OPERATION

FIELD OF THE INVENTION

This invention relates to communications systems. The invention is applicable to, but not limited to, trunked radio communications systems and the allocation of communications channels therein.

BACKGROUND OF THE INVENTION

In wide-area trunking systems, such as SmartZone (trade mark), channels may be reserved for a period of time without being used. A typical situation would be when one or more mandatory sites required in a wide-area call are busy, i.e. channels are not available on these sites, whilst on other communications sites, channels are immediately available. In such situations, the wide-area call is not initiated until all of the necessary channels are available on all of the appropriate communications sites. During this period, whilst waiting for the availability of the necessary channels, the channels that are available are reserved for the wide-area call, but are consequently not used until the call is set up. The reservation of communication channels until a call is set up creates a waste of the valuable communications resource. This problem is significant during busy periods when such call set-up times are lengthy and frequent.

One approach used to resolve this wastage problem is to minimize the time of busy periods by reducing the number of mandatory sites used in a particular group call. This solution is not optimal as it does not address the wastage problem but only reduces the number of sites that are affected by the reservation process.

Thus, it is desirable to have a wide-area radio communications system, and a method of operation therein, which avoids such a wastage of communications resource.

SUMMARY OF THE INVENTION

In a first aspect of the present invention, a method of operating a communications system, having a controller for controlling communications of a plurality of communicating units on a plurality of communication channels, is provided. The method includes the steps of a first communicating unit transmitting a call request to the controller on a communications channel of the communications system and the controller reserving at least one first communications channel for at least one of the communicating units required in the requested call. The controller waits for the availability of a second communications channel wherein the second communications channel is to be allocated to a second communications unit required in the requested call. In the meantime, the controller allocates the at least one first communications channel for temporary communications.

In this manner, the reserved first communications channel is available to communicating units for temporary communications whilst the requested call is being set up and all of the necessary communications channels become available.

Preferably the radio communications system is a trunking radio communications system and in a preferred embodiment the call request is a group call request. The method further includes the step of transmitting a group call request by the controller to the communications units involved in the requested call. On completion of the group call at least one communicating unit involved in the group call transmits an end of group call message to the controller and making available the communications channels used in the group call. Preferably a broadcast message is transmitted by the controller to the communicating units indicating the availability, for temporary communications, of the reserved at least one first communications channel.

In this manner, the availability of the at least one reserved first communications channel is broadcast to all of the communicating units in the trunked radio communications system.

Advantageously, during busy periods, and in particular when the group call involves a large number of communicating units, the controller offers temporary communications to communicating units on a number of reserved first communications channels whilst waiting for the required number of communications channels, required for the requested group call, to become available.

Preferably the controller comprises a master controller operably coupled to a number of site controllers and wherein each site controller controls communications in a communication cell. The temporary communications on the reserved at least one first communications channel are data messages transmitted between a first communications unit and the controller or the reserved communications channel is allocated as a temporary control channel by the controller.

In this manner, wide-area communications systems having a number of communications cells and a plurality of communications channels and communicating units, wherein communications are controlled by individual site controllers, use the reserved at least one first communications channels for temporary communications.

Advantageously, the temporary communications take the form of short data messages or the reserved at least one first communications channels is allocated as a temporary control channel by the controller dependent upon the current needs of the communications system.

In a second aspect of the present invention, a communications system having a channel allocation controller for controlling communications of a plurality of communicating units over a plurality of communication channels is provided. The channel allocation controller has a list of communications channels with reserved indicators indicative of the status of reserved communications channels and the channel allocation controller is responsive to the list of channels for generating temporary channel grant commands for granting the reserved channels for temporary communications to communicating units.

In this manner, a channel allocation controller is provided having a list of channel status indicators to indicate the current status of each reserved communications channel. The controller generates temporary channel grant commands according to the list of channels and the needs of communicating units in the communications system.

Advantageously, the controller determines the operational requirements within the communications system and optimally utilizes the reserved channels for temporary communications accordingly.

A preferred embodiment of the invention will now be described, by way of example only, with reference to the drawings.

BRIEF DESCRIPTION OF THE DRAWINGS

FIG. 3 shows an extension of the timing diagram of FIG. 2, in accordance with a preferred embodiment of the invention.

DETAILED DESCRIPTION OF THE DRAWINGS

Figure 1:
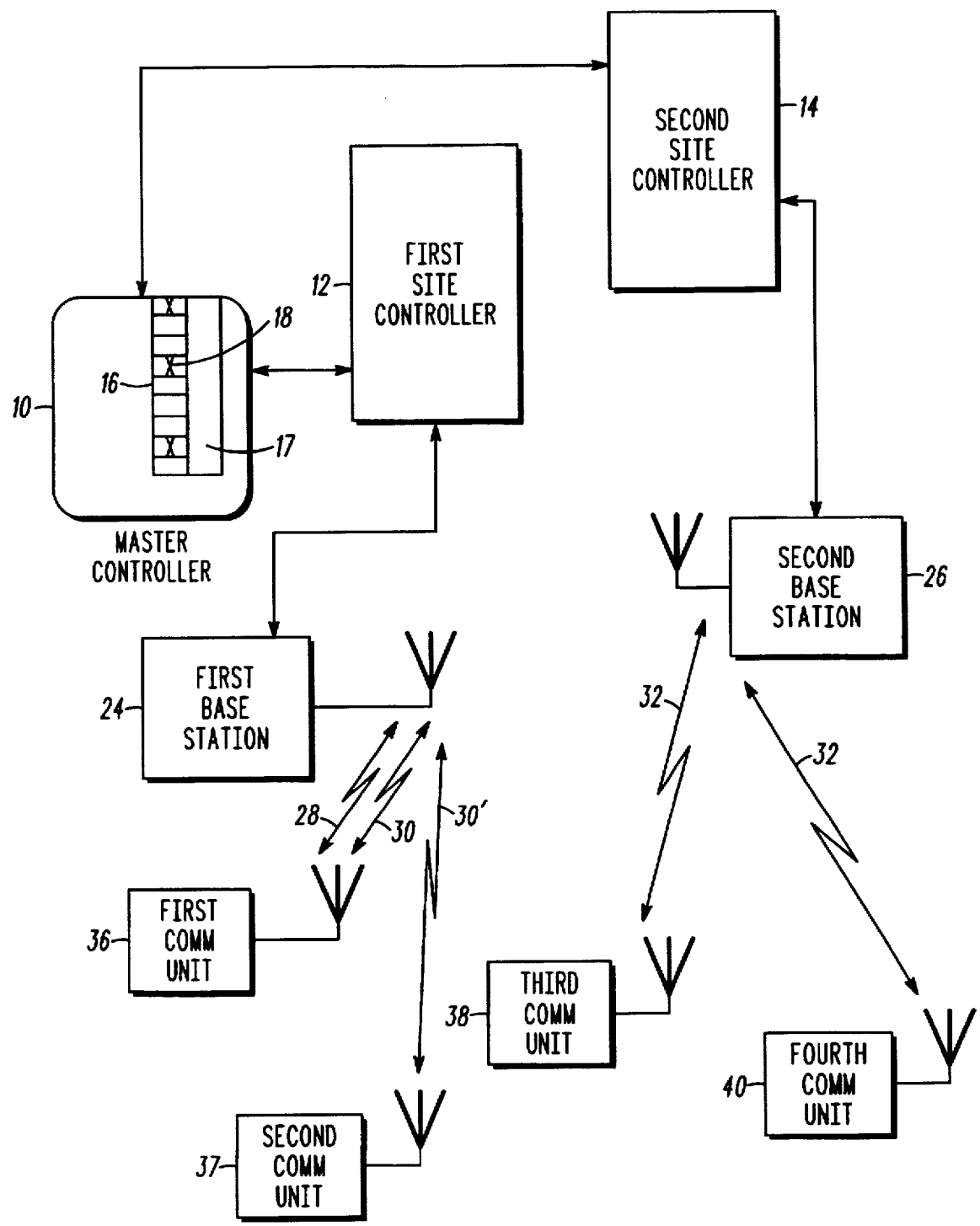
FIG. 1 is a block diagram of a trunked radio communications system according to a preferred embodiment of the invention.

Referring first to FIG. 1, a block diagram of a trunked radio communications system, according to a preferred embodiment of the invention, is shown. The trunked radio communications system has a controller comprising a master controller 10 operably coupled to both a first site controller 12 and a second site controller 14. The master controller 10 performs channel allocation functions and has a list of communications channels 16 with channel-reserved indicators 18. Connected to the list of communications channels 16 is a list of channel grant commands 17. The first site controller 12 is operably coupled to at least one base station, base station 24, and the second site controller 14 operably coupled to at least a second base station 26.

In this manner communications channels are allocated by the master controller 10 to a plurality of communicating units 36, 37, 38 and 40 over a plurality of communication channels 28 to 32 on a number of communication sites.

In operation, a first communications unit 36 transmits a group call request to the first site controller 12 via the base station 24 on a communications channel 28. The first site controller 12 re-transmits the group call request to the master controller 10 where at least one first communications channel 30 is reserved, at the first site controller, for the first communicating unit 36 for the subsequent requested group call. Whilst the master controller 10 waits for the availability of second communications channels 32 and 32, to be allocated to second communications units 38 and 40, required in the requested group call, the controller allocates the first communications channel 30 for temporary communications to a fourth communications unit 37, not involved in the requested group call. The allocation of temporary communications by the master controller 10 is performed by transmitting a channel grant command 17, according to the reserved communications channels indicators 18 on the communications channel list 16, to the fourth communications unit 37. The temporary communications channel 30' may be used for short data messages or the temporary communications channel 30' may be allocated as a temporary control channel. The master controller 10 continuously updates the list of communications channels 16 and reserved indicators 18. The reserved indicators 18 are indicative of the status of reserved communications channels, e.g. the at least one first communication channel 30 is currently allocated as a temporary communications channel 30'. The master controller 10 is responsive to the list of communications channels 16 and generates temporary channel grant commands 17 for temporarily granting the reserved communications channels to other communicating units at the appropriate communication sites. In an alternative embodiment, a contention mode of operation is used by communicating units when attempting to use the temporarily reserved communications channel 30'.

Advantageously the at least one first communications channel 30 is used as a temporary at least one first communications channel 30' by the fourth radio communications unit 37 whilst the master controller 10 awaits the availability of a sufficient number and distribution of free-channels to instigate the requested group call. It is within the contemplation of the invention that the operation of the master controller 10 and a number of site controllers 12 and 14 may be combined in a single site controller for non-wide-area communications. The temporary use of the reserved at least one communication channel 30' may be used for any communications on the communications system: be they of a group call nature or, for example, direct mode two-way communications. Any number of channels are used for temporary communications until the required number and distribution of free-communication channels is available in order for the master controller 10 to complete the requested call.

Figure 2:
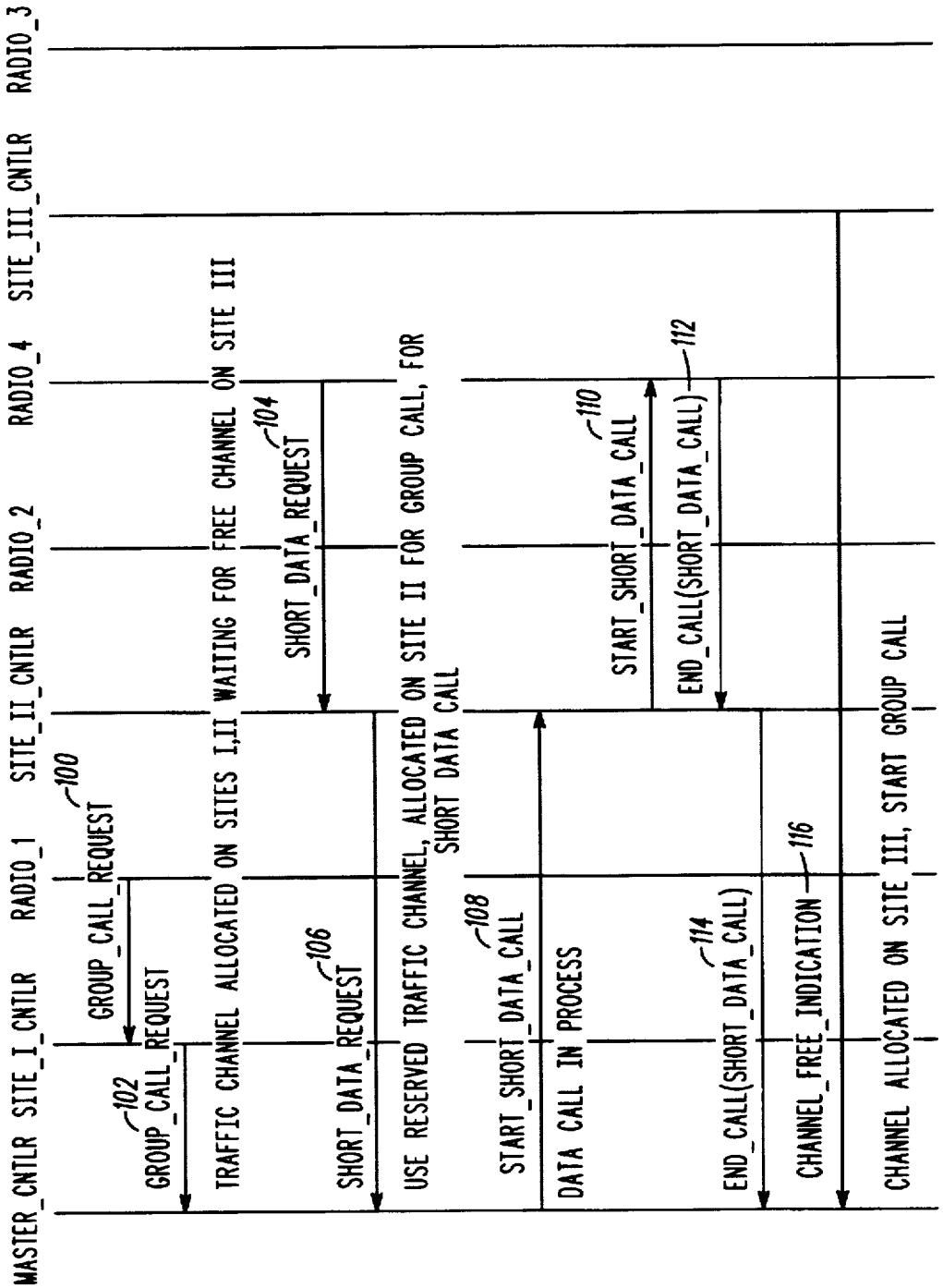
FIG. 2 shows a timing diagram of a method of operating the trunked radio communications system, in accordance with a preferred embodiment of the invention.

Referring now to FIG. 2, a timing diagram of a method of operating the radio communications system, in accordance with a preferred embodiment of the invention is shown. The radio communications system has a controller for controlling the communications of a plurality of communicating units on a plurality of communication channels. The method of operation of the radio communications system includes the steps of a first communications unit transmitting a call request to the controller on a communications channel of the radio communications system. The controller reserves at least one first communications channel for at least one of the communications units required in the requested call and waits for the availability of at least one second communications channel wherein the second communications channel is to be allocated to a second communications unit required in the requested call. The controller allocates the at least one first communications channel for temporary communications whilst waiting for the availability of at least the second communications channel.

Preferably the method further includes the step of the controller transmitting a broadcast message wherein the broadcast message indicates to other communications units in the communications system the availability for temporary communications of the reserved at least one first communications channel.

The method of operation described in FIG. 2 is given by way of example only. A first communications unit transmits a group call request, as shown in step 100, to a first site controller on a communications channel. The first site controller re-transmits the group call request to a master controller, as in step 102. Traffic channels are reserved in first and second sites according to the distribution of communicating units required in the requested group call. The master controller awaits the availability of one or more free channels in a third site in order to complete the call set-up of the requested group call.

Whilst the master controller awaits the availability of free channels in the third site, the second site controller receives a short data request from a fourth communications unit, as shown in step 104. The second site controller re-transmits the short data request to the master controller, as in step 106. The master controller allocates the reserved group call traffic channel on the second site, for short data messages to the fourth communications unit, by transmitting a start the short data call message to the second site controller, as in step 108. The start the short data call message is re-transmitted from the second site controller to the fourth communications unit, as shown in step 110. Subsequently, the fourth communications unit uses the reserved group call traffic channel for short data messages. On completion of the short data messages the fourth communications unit transmits an end of short data call message to the second site controller, as in step 112, and the second site controller re-transmits the end of short data call message to the master controller, as shown in step 114. When communications channels become available at the third site, the third site controller transmits a channel-free indication to the master controller, as shown in step 116. Once all the necessary communications channels are available, the master controller initiates the requested group call as shown in FIG. 3.

FIG. 3 shows an extension to the timing diagram of FIG. 2, in accordance with a preferred embodiment of the invention. The master controller initiates the group call by transmitting a start group call message to the corresponding first, second and third site controllers, as shown in steps 118 to 122. The first, second and third site controllers transmit start group call messages to all of the corresponding communications units required in the requested group call, as in steps 124 to 128. The setting up of the group call is then complete. Advantageously, with the combination of the methods described in FIG. 2 and FIG. 3, communications channels unused and reserved during the group call set-up process have been used for temporary communications by other communicating units in the communications system. Once the group call communication is complete, an end of group call message is transmitted by the first communications unit to the first site controller, as in step 130 and this message re-transmitted by the first site controller to the master controller, as shown in step 132. The master controller then transmits the end of group call message to the second and third site controllers in steps 133, 134 and 136 and the second and third site controllers re-transmit the end of group call message to all of the communications units involved in the group call, as in steps 138 and 140.

In an alternative embodiment of the present invention, the master controller terminates the group call, e.g. on call time-out, without receiving the end of group call message from a site controller, i.e. step 132.

It is within the contemplation of the invention that any communication in the communications system requiring or using a "reserve communication channels" process whilst setting up the communication may use the aforementioned preferred embodiment of the invention.

Thus, a wide-area radio communications system, and a method of operation therein, is provided, wherein an improved use of reserved communications channels is achieved, particularly during busy call periods.

We claim:

1. A method of operation of a radio communications system having a controller for controlling communications of a plurality of communicating units on a plurality of communication channels, the method comprising the steps of:

transmitting a call request to the controller on a communications channel of the radio communications system by a first communications unit;

reserving at least one first communications channel for at least one of the communications units required in the requested call by the controller;

waiting for the availability of a second communications channel by the controller wherein the second communications channel is to be allocated to a second communications to a communications unit not involved in the requested call unit required in the requested call; and allocating by the controller the at least one first communications channel for temporary communications whilst the controller waits for the availability of the second communications channel for the requested call.

2. A method according to claim 1, wherein the radio communications system is a trunked radio communications system and the call request is a group call request and wherein the method further comprises the step of transmitting a group call request by the controller to the communications units involved in the requested call.

3. A method according to claim 2, further comprising the step of transmitting an end of group call signal to the controller on completion of the group call, by at least one communicating unit involved in the group call, wherein the communications channels used in the group call are subsequently available for further communications.

4. A method according to claim 2, further comprising the step of terminating the group call, by the controller, wherein the communications channels used in the group call are subsequently available for further communications.

5. A method according to claim 1, wherein the method further comprises the step of transmitting a broadcast message by the controller wherein the broadcast message indicates the availability for temporary communications of the reserved at least one first communications channel.

6. A method according to claim 1, wherein the controller comprises a master controller operably coupled to a number of site controllers and wherein each site controller controls communications in a communication cell.

7. A method according to claim 1, wherein temporary communications on the reserved at least one first communications channel are data messages transmitted between a first communications unit and the controller and wherein a contention mode of operation is used for communicating units using the reserved at least one first communications channel, prior to call set-up being completed.

8. A method according to claim 1, wherein the reserved communications channel is allocated as a temporary control channel by the controller.

* * * * *